June 22, 1954  S. C. RETHORST  2,681,773
ROADABLE AIRCRAFT
Filed Oct. 11, 1948  2 Sheets-Sheet 1

INVENTOR.
Sero C. Rethorst

June 22, 1954     S. C. RETHORST     2,681,773
ROADABLE AIRCRAFT

Filed Oct. 11, 1948     2 Sheets-Sheet 2

SECTION A-A

INVENTOR.

Patented June 22, 1954

2,681,773

UNITED STATES PATENT OFFICE 2,681,773

ROADABLE AIRCRAFT

Scott C. Rethorst, Washington, D. C.

Application October 11, 1948, Serial No. 53,847

1 Claim. (Cl. 244—2)

This invention relates to improvements in aircraft and has particular reference to an improved roadable aircraft of low aspect ratio as disclosed in my earlier copending application Serial No. 757,121, filed June 26, 1947, now Patent No. 2,561,291.

More particularly the invention relates to an aircraft of the flying wing type, having a low aspect ratio, with engine driven propellers so disposed that the entire aircraft is immersed in the propeller slipstreams, and of dimensions that will permit travel on the ground over public highways, yet having stub wings mounted in a unique fashion to provide increased span for flight.

The desirable objective of an inherently roadable aircraft that can travel along the ground over public highways without folding, movable, or removable wings is apparent. Such a highly useful aircraft was disclosed in said copending application.

The improvement over the aircraft described in my copending application consists essentially of the addition of stub wings, which are extendable for increased span, and yet may be so folded as to retain the essential advantages of an inherently roadable aircraft.

It is a fundamental fact in aerodynamics that for any given weight to be lifted the induced drag penalty will decrease as the mass of air acted upon by the wing is made to increase. On the other hand the parasite drag increases as the mass of air increases, so design is a compromise to give the lowest total drag, yet permitting adequate takeoff. Clearly one of the chief factors determining this mass of air is the wing span, which normally is selected by these considerations.

In an inherently roadable aircraft, the eight foot maximum legal width of motor vehicles allowed on highways imposes an eight foot limit on the span. In such a case the span for minimum drag and takeoff must accordingly be compromised, and since the eight foot span is considerably less than that required to lift a passenger carrying aircraft, means other than span must be provided to increase the mass of air acted upon by the wing, if efficiency is not to be seriously impaired.

Such a novel means for an inherently roadable aircraft is described in my copending application, in the form of substantial immersion of the aircraft in the propeller slipstreams. This feature produces a higher velocity, and hence a correspondingly lower pressure, over the upper surface of the wing, which induces the downward flow of a greater mass of air, with the further highly desirable feature of having this effect automatically increase as the forward flight speed decreases, thereby tending to offset the decrease in mass of air acted upon by the wing in consequence of the lower flight velocity. This novel feature adequately compensates for the reduction in span to eight feet, thereby achieving the much desired feature of inherent roadability in a light aircraft carrying a plurality of passengers. It also offers the further advantage of improved flight performance over conventional light aircraft.

It is apparent, however, that as the weight to be lifted increases, it will become increasingly difficult to compensate for the reduction in span from conventional dimensions, as determined by minimum drag and normal takeoff considerations, to the dimension of approximately eight feet as required to make the vehicle roadable.

It is therefore an object of this invention to provide a means of increasing the span so that greater weights may be lifted by an aircraft that is essentially inherently roadable, yet without encountering the disadvantages normally present in conventional folding wing aircraft, such as the extreme clumsiness of large, awkward, and impractical wings.

A further object of the invention is to provide in an aircraft folding stub wings of airfoil shape in section which will provide additional span and yet essentially retain the advantages of an inherently roadable airplane.

A still further object of the invention is to provide such stub wings having the same shape in plan as the central flying wing has in section, so that the stub wings, mounted on a longitudinal hinge line below the median chord line of the center wing, will when folded substantially conform to the outline of the sides of the center wing against which they lie for road travel.

An additional object of the invention is to provide stub wings of such a shape in plan form that when in combination with the primary flying wing section they may be mounted in a fashion that is exceedingly simple structurally, lending themselves readily to the folding operation, and consequently easy to build and economical in cost.

Further, the invention provides stub wings of a shape and means of mounting that provide a relatively low distribution of loading over their forward tip portions. This feature permits the construction of these lightly loaded areas to be of transparent material, thereby achieving the unique advantage of visibility through these sections, which when folded lie substantially to the sides of and thus in the line of sight to the sides of the pilot and passengers.

This is in contrast to conventional folding wing aircraft, where a wing of considerable span is folded at the root by the sides of the fuselage. In such a conventional aircraft the extensive air loads distributed over the entire wing are necessarily all gathered from the outerspan into the root section, which must then be highly loaded. In modern stressed skin aircraft construction, the skin is used as an integral part of the wing beam to carry bending and torsional loads.

Modern aircraft construction of a conventional span wing would thus require the wing root skin to carry quite heavy loads. Currently available transparent materials such as Lucite, Plexiglas, and glass have much lower strength to weight ratios than have available and currently used nontransparent materials, such as aluminum and magnesium alloys. It is thus apparent that in a conventional aircraft the prospect of a very considerable weight penalty effectively prevents the use of transparent material to provide visibility to the sides when the wings are folded.

The present invention accordingly provides a unique combination of elements that permits the attainment of visibility to the sides through folding transparent wings, in contrast to the situation in a conventional aircraft having folding wings, where side visibility is not provided and appears impractical of attainment, thereby seriously limiting the possibilities of incorporating roadability in such aircraft.

A further advantage of the invention is the provision of improved lateral stability, by mounting the stub wings so as to provide adequate dihedral.

A still further advantage of the invention is the provision of improved lateral control. The stub wings are located at an increased distance from the center longitudinal axis of the aircraft. Differential lift forces assumed by the two stub wings, caused by movable trailing edge surfaces, or any suitable means, will therefore provide increased rolling moments about this axis, thereby improving the lateral control.

The features of my invention will be illustrated in the accompanying drawings and described in the following detailed specification, a certain preferred embodiment being disclosed by way of illustration only; for since the underlying principles may be incorporated in other specific devices, it is not intended to be limited by the form of the invention disclosed here except as any limitations are clearly imposed by the appended claim.

In the drawings, wherein like numerals refer to like or corresponding parts throughout the several views.

Figure 1:
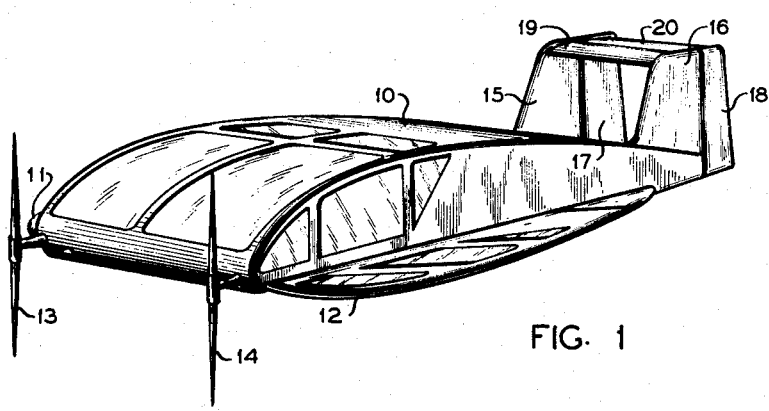
Figure 1 is an overall perspective view of a roadable aircraft embodying the features of the present invention, and showing the aircraft in normal flight.
Figure 6:
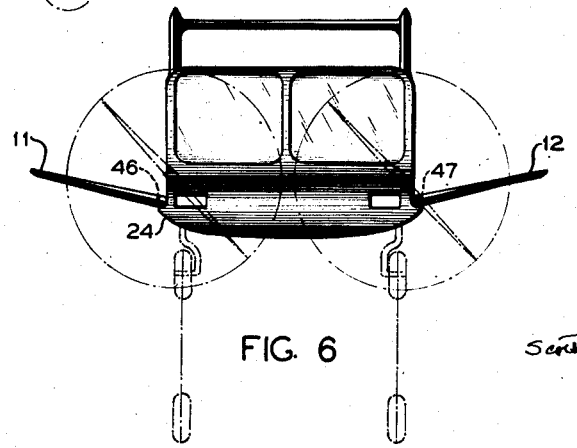
Figure 6 is a front elevation of the aircraft of Figure 1.

Referring now to the drawings in more detail, and in particular to Figure 1, there is illustrated a flying wing type aircraft in accordance with the present invention comprising a main body or fuselage 10 of airfoil shape, on the sides of which are mounted two stub wings 11 and 12. Only one of these stub wings is shown completely in Figure 1, but both are shown in Figure 6. Two tractor propellers 13 and 14 are mounted on the leading edge of the main body 10 so as to substantially immerse the entire airfoil, consisting of the main body 10 and the two stub wings 11 and 12, in the propeller slipstreams.

Figure 3:
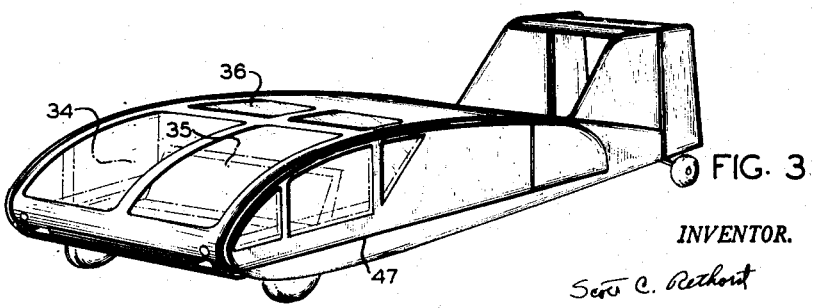
Figure 3 is a similar perspective view of the aircraft of Figure 1, showing the aircraft in the highway configuration.

In one form of the invention the body of the aircraft with the stub wings in the folded position for ground travel is eight feet wide and twenty-four feet long. This ground configuration is shown in Figure 3.

The stub wings are mounted on the center airfoil along longitudinal hinge lines so that for ground travel they fold up to an approximately vertical position and lie along the sides and substantially conform to the outline of the center airfoil; the shape in plan form of the stub wings being essentially that of the center airfoil in longitudinal vertical section. The stub wings are about five inches in thickness at the hinge line and forty-nine inches in span from the hinge center line. The center span would be approximately ninety-one inches between hinge center lines, which would make the overall width, with stub wings folded, approximately eight feet.

In the flight configuration the stub wings are extended as shown in Figure 1, and in the one form given as an example, the total span will then be approximately fifteen feet and nine inches. The two propellers are located with their plane one foot ahead of the wing leading edge, giving an overall length for the aircraft of approximately twenty-five feet. The airfoil for the center section is NACA No. 104, which has a maximum thickness of twenty-one percent of the airfoil length, which in this case is then 5.04 feet. Two engines each of 145 horsepower are provided, each driving a propeller 6.5 feet in diameter. These two propellers are located with a six inch clearance between their tips so that the total width between the extreme propeller tips is 13.5 feet.

The entire aircraft, including the center section and the extended stub wings, forms a low aspect ratio airfoil of such dimensions that when in combination with the most efficient propeller dimensions and their location ahead of the leading edge, practically the entire aircraft is immersed in the propeller slipstreams and thereby induced drag is kept to a reasonable value at climbing and cruising speeds.

Figure 5:
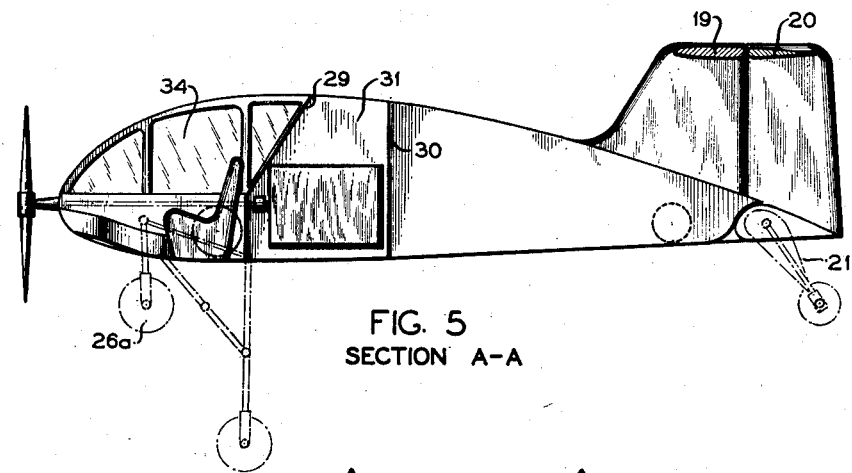
Figure 5 is a longitudinal section view of the aircraft taken along the line A—A of Figure 4.

Stabilizing and control surfaces mounted on the aircraft include two vertical fins 15 and 16 for maintaining directional stability, rudders 17 and 18 to provide directional control, a horizontal stabilizer 19 for longitudinal trim mounted between the vertical fins, and an elevator 20 mounted on the stabilizer to provide longitudinal control. A slotted trailing edge flap 21, as shown in Figure 5, is provided to give increased lift at a reduced angle of attack during landing. If desired, the elevator 20 may be coupled to the flap 21 so as to compensate automatically for the change in pitching moment caused by lowering the flap.

Figure 4:
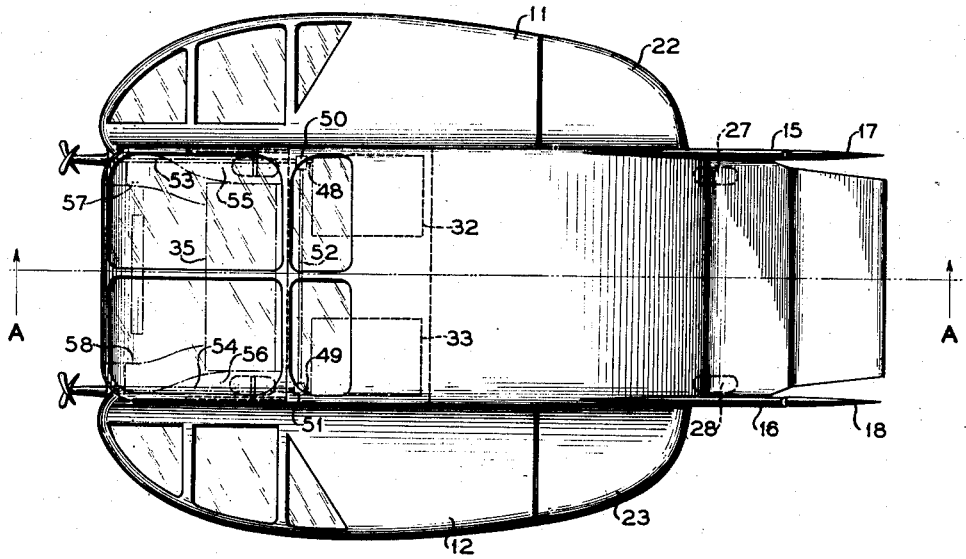
Figure 4 is a top plan view of the aircraft of Figure 1.

Also as indicated in Figure 4 ailerons 22 and 23 are mounted at the trailing edge of stub wings 11 and 12. These ailerons are operated differentially to provide lateral control, and in addition, if desired, may be depressed together during landing to act as additional trailing edge flap surfaces to increase further the lift at a reduced angle of attack for landing.

It will be noted particularly in Figures 1 and 6 that the bottom surface of the fuselage 10 is somewhat convex as indicated at 24, which acting in conjunction with the vertical fins 15 and 16, gives the aircraft inherent lateral stability. Also the stub wings 11 and 12 when extended as shown in Figure 6 continue at the dihedral angle provided by the under surface of the main body 10 to aid further in the provision of lateral stability. Furthermore, the low aspect ratio plan form itself, adds to the lateral stability.

Longitudinal stability is inherent in rectangular airfoils of aspect ratio less than one, and in semicircular tip airfoils of aspect ratio less than one and one-half, so the plan form of this aircraft, being intermediate between these two types, and of an aspect ratio less than one, will be longitudinally stable. Changes in trim as required, such as when the landing flap is lowered, will be provided by the stabilizer 19 and the elevator 20.

Figure 2:
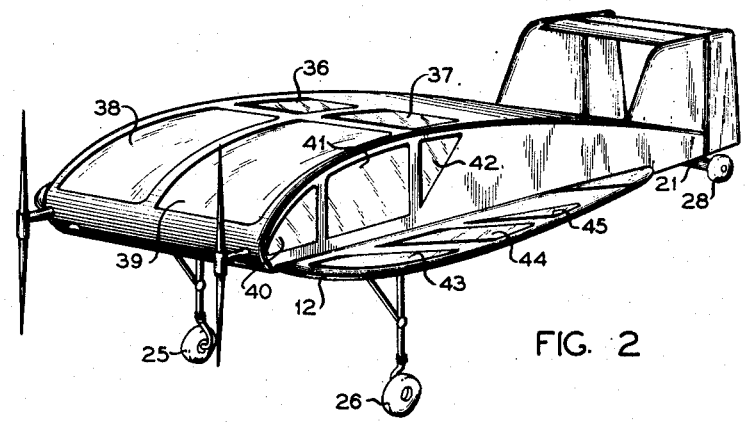
Figure 2 is a similar perspective view of the aircraft of Figure 1, showing the aircraft in the landing configuration.

As is shown in Figure 2, the retractable landing gear comprising the two forward wheels 25 and 26 and the rear wheels 27 and 28 extend and the trailing edge flap 21 lowers for aircraft to assume the conventional landing configuration.

For highway travel, the propellers may be stopped in the vertical position, or normally would be removed, as shown in Figure 3. In either case, with the stub wings folded, the overall width of the aircraft is only eight feet, not exceeding the maximum width allowable for highway travel. For such highway operation, when the propellers are removed, they may be carried in the aircraft.

Also for this highway configuration, the forward landing gear partially folds up and forward to an alternative external position designated at 26a, as illustrated in Figure 5, which allows the aircraft body to ride level with and close to the ground, which is desirable for highway operation. If the propellers are left mounted on the aircraft and stopped in the vertical position, they will clear the road by one foot when the landing gear is in the folded position, as shown in Figure 5.

This arrangement also improves the center of gravity location for ground travel. The aircraft has a conventional landing gear in the sense that the forward wheels 25 and 26, in the landing configuration as shown in Figures 2 and 5, are located only slightly forward of the center of gravity to minimize the control moments that must be applied by the elevator to vary the attitude of the aircraft in landing and takeoff maneuvers. Consequently, the movement of the wheels 25 and 26 to the forward position 26a locates these wheels farther ahead of the center of gravity than is ordinarily desirable for aircraft use, but which is highly desirable for highway use, distributing the weight of the aircraft body more nearly equally between the front and rear wheels, a condition prerequisite to good surface riding qualities.

The wheels of the landing gear are constructed and arranged for steering during ground operation and road travel and suitable auxiliary means are provided for driving the wheels in either direction, but as these largely conventional features form no part of the present invention they will not be described in further detail.

The interior arrangement of the aircraft is illustrated in Figures 3, 4 and 5. As shown particularly in Figure 5, a relatively thick airfoil section (NACA No. 104, TR 391) is employed in order to provide adequate space to house both passengers and engines. The basic structure comprises a main box spar having substantially vertical web portions 29 and 30 and constituting an engine compartment 31 wherein are located in the present embodiment two suitable engines of any conventional type designated by reference numerals 32 and 33 in Figure 4. The passenger enclosure 34, shown in Figure 5, is entirely located within the forward end of the fuselage 10, ahead of the forward web 29 of this box spar.

By this arrangement the major loads are concentrated near the center of gravity and the necessity for auxiliary firewalls is obviated. The noise in the passenger enclosure is also reduced by location of the engines rearward.

As shown in Figure 3, the leading edge portion of the fuselage 10 constitutes a pilot and passenger enclosure 34 provided with a transversely extending seat 35 and an access door 36 at the top.

The usual controls and instruments are provided in the pilot's compartment, but as these features may follow conventional practice they are not shown in the drawings or described in detail.

As shown in Figure 2, the access door 36 and the other upper portions 37, 38 and 39 of the center airfoil, as well as the side panels 40, 41 and 42 (and similar panels not shown on the opposite side of the fuselage) substantially surrounding the passenger compartment 34 are constructed of a transparent material such as glass or Plexiglass. These sections may include a plurality of strengthening ribs (not shown) for withstanding aerodynamic forces.

Also as shown in Figure 2, the forward section of stub wing 12 contains similar transparent panels 43, 44 and 45, located so as to match panels 40, 41 and 42 when the stub wing is folded for highway travel as in Figure 3. Stub wing 11 on the other side of the fuselage is similarly constructed. This arrangement provides unrestricted visibility to the sides, unobstructed by the presence of the stub wings themselves even when folded against the sides of the fuselage 10.

Integral with the construction of the stub wings 11 and 12 are the torque tubes 46 and 47, which gather the air loads and provide an efficient means of folding and extending the stub wings.

As seen in Figure 4, the engines 32 and 33 mounted within the compartment 31 are connected by stub shafts 48 and 49 to overriding clutch mechanisms 50 and 51 so that in the event of failure an engine may disengage and the other engine because of the cross connecting shaft 52 will drive both propellers 13 and 14.

The propeller shafts 53 and 54 run from the overriding clutch mechanisms 50 and 51 forward to the propellers 13 and 14 through compartments 55 and 56, which also house the forward landing gear and wheels when retracted, as shown in Figure 5. The air intake ducts 57 and 58 for engine cooling and carburetion run from the leading edge aft to the engine compartment along the floor of the passenger compartment 34 adjacent to the propeller shaft compartments 55 and 56 and under the seat 35, as shown in Figures 4 and 5.

From the foregoing detailed description it will be apparent that the present invention provides a flying wing aircraft of low aspect ratio with two propellers of conventional diameter mounted on the leading edge of the wing whereby the entire aircraft is substantially immersed in the propeller slipstreams. The aerodynamic reasoning outlining in detail the means whereby this arrangement increases lift is given in my copending application Serial No. 757,121, now Patent No. 2,561,291.

While a preferred form and method of employing the invention have been disclosed in detail, it is to be understood that the invention lends itself to numerous variations without departing from the basic principles or the scope of the appended claim.

Having thus described my invention, what I claim as novel and desire to secure by Letters Patent of the United States is:

A roadable aircraft of the all-wing type, comprising a primary lifting airfoil containing the pilot's enclosure, the sides of said airfoil being substantially flat and generally vertical, and having window openings provided therein for vision to the sides, a pair of stub wings hinged to opposite sides of said airfoil for swinging movement between a laterally extended flight position and a folded position, substantially flat against the sides of said airfoil, said stub wings having transparent portions provided therein which register with said window openings when said stub wings are in said folded position, whereby vision through said window openings is unobstructed, and a plurality of tractor propellers mounted on the leading edge of said airfoil so that said airfoil and said stub wings when extended are substantially immersed in the propeller slipstreams.

References Cited in the file of this patent

UNITED STATES PATENTS

| Number | Name | Date |
|---|---|---|
| 1,980,246 | Austin | Nov. 13, 1934 |
| 2,108,093 | Zimmerman | Feb. 15, 1938 |
| 2,294,367 | Fleming | Sept. 1, 1942 |
| 2,426,086 | Fehr | Aug. 19, 1947 |